(12) United States Patent
McMillan et al.

(10) Patent No.: US 6,736,005 B2
(45) Date of Patent: May 18, 2004

(54) HIGH ACCURACY MEASURING AND CONTROL OF LOW FLUID FLOW RATES

(75) Inventors: Robert M. McMillan, Georgetown, TX (US); Roland Rau, Georgetown, TX (US)

(73) Assignee: McMillan Company, Georgetown, TX (US)

( * ) Notice: Subject to any disclaimer, the term of this patent is extended or adjusted under 35 U.S.C. 154(b) by 0 days.

(21) Appl. No.: 10/156,402

(22) Filed: May 28, 2002

(65) Prior Publication Data

US 2003/0221483 A1 Dec. 4, 2003

(51) Int. Cl.$^7$ ................................................ G01F 1/68
(52) U.S. Cl. .................................. 73/204.21; 73/204.27
(58) Field of Search ......................... 73/204.11, 204.15, 73/204.16, 204.17, 204.23

(56) References Cited

U.S. PATENT DOCUMENTS

| | | | |
|---|---|---|---|
| 956,785 A | 5/1910 | Thomas | |
| 2,087,170 A | 7/1937 | Stephenson | |
| 2,552,017 A | 5/1951 | Schwartz et al. | |
| 2,591,195 A | 4/1952 | Picciano | |
| 2,685,800 A | 8/1954 | Natelson | |
| 2,777,325 A | 1/1957 | Groenhof et al. | |
| 3,138,025 A | 7/1960 | Fingerson | |
| 3,335,606 A | 6/1964 | Scarpa | |
| 3,757,808 A | 9/1973 | Peterson et al. | |
| 3,857,458 A | 12/1974 | Ohtani et al. | |
| 3,992,940 A | 11/1976 | Platzer, Jr. | |
| 4,028,689 A | 6/1977 | Schopp | |
| 4,087,301 A | 5/1978 | Steadman | |
| 4,135,396 A | 1/1979 | Stanke et al. | |
| 4,255,968 A | 3/1981 | Harpster | |
| 4,257,450 A | 3/1981 | Ollivier | |
| 4,357,936 A | 11/1982 | Ellestad et al. | |
| 4,458,709 A | 7/1984 | Springer | |
| 4,480,467 A | 11/1984 | Harter et al. | |
| 4,491,024 A | 1/1985 | Miller, Jr. | |
| 4,532,811 A | 8/1985 | Miller, Jr. et al. | |
| 4,554,136 A | 11/1985 | Chai et al. | |
| 4,690,245 A | 9/1987 | Gregorich et al. | |
| 4,813,280 A | 3/1989 | Miller, Jr. et al. | |
| 4,877,051 A | 10/1989 | Day | |
| 5,035,138 A | 7/1991 | Abdel-Rahman | |
| 5,036,701 A | * 8/1991 | van der Graaf | 73/204.12 |
| 5,092,170 A | * 3/1992 | Honstvet et al. | 73/295 |
| RE34,104 E | 10/1992 | Takahashi et al. | |
| 5,209,115 A | * 5/1993 | Bond | 73/295 |
| 5,222,395 A | 6/1993 | Matubara et al. | |
| 5,764,539 A | 6/1998 | Rani | |
| 5,765,432 A | 6/1998 | Lock et al. | |
| 5,831,159 A | 11/1998 | Renger | |
| 5,836,693 A | 11/1998 | Stulen et al. | |
| 5,911,238 A | 6/1999 | Bump et al. | |
| 5,980,102 A | 11/1999 | Stulen et al. | |
| 6,032,525 A | * 3/2000 | Suetake | 73/204.15 |
| 6,119,710 A | 9/2000 | Brown | |
| 6,318,171 B1 | * 11/2001 | Suzuki | 73/204.27 |

* cited by examiner

Primary Examiner—Harshad Patel
(74) Attorney, Agent, or Firm—Bracewell & Patterson, LLP

(57) ABSTRACT

The flow of a fluid at low flow rates is measured and controlled without introducing measuring devices into the fluid flow path. As the fluid is flowing through tubing, the tubing is heated to impart heat to the fluid. Heat sensors are attached at spaced positions from each other along the tubing in the direction of fluid flow to sense temperatures. The amount of heat applied to the tubing is controlled to maintain an established temperature differential between the heat sensors. The amount of heat applied is measured to provide an accurate and proportional indication of the fluid flow rate.

14 Claims, 8 Drawing Sheets actual flow vs. indictated flow deviation of response

HIGH ACCURACY MEASURING AND CONTROL OF LOW FLUID FLOW RATES

BACKGROUND OF THE INVENTION

1. Field of the Invention

The present invention relates to measuring and control of fluid flow, particularly at low fluid flow rates. More particularly, the present invention permits such measurement and control without introducing measuring sensors or devices into the path of the fluid flow.

2. Description of the Related Art

Measurement of the flow or flow rate of a fluid in a conduit, particularly, at very low fluid flow rates, has been a problem if attempted using conventional flow sensors. At very low flow many fluid sensors do not operate properly. For example, velocity flow meters such as turbine wheel flow sensors cease to operate due to there being insufficient energy in the fluid to rotate the wheel. Differential pressure flow sensors can at times operate at low flows, but the smaller flow orifices required for low flows have been prone to obstruction if there were suspended particles in the fluid. Also, pressure drops across the orifices could be significant.

Most thermal flow sensors have the temperature sensing mechanism as a resistance bridge circuit or as a part of the entire temperature variant area whereby a change in flow has the equal and opposite effect on the two halves of the sensor. This can have a limiting effect on the range of the sensor and ambient temperature changes can affect the accuracy.

Specialized flow sensing techniques have been attempted in certain cases. For example, U.S. Pat. No. 5,035,138 used a resistive material formed of a special alloy as a tube or conduit through which a gas flowed. The special alloy was selected because of a high electrical resistivity and a high temperature coefficient of resistance. A voltage differential was applied to the resistive alloy conduit at defined positions. The resistive material of the conduit was used to heat the fluid flowing in it according to the voltage differential applied. The resistive alloy material tube acted both to heat the fluid and as an indicator of flow conditions. Spaced portions of the tube wall served as temperature sensitive resistors which developed a voltage differential as flow rates through the tube varied. The flow sensor of this patent required that the fluid tube or conduit be formed of a special resistive alloy having a high change in resistance value as a function of temperature change.

SUMMARY OF THE INVENTION

Briefly, the present invention provides a new and improved system and method for measuring the flow of fluid in a conduit which is transporting the fluid. A set of at least two heat detectors is mounted on the conduit at spaced positions from each other on the conduit. The heat detectors measure the temperature of the fluid and conduit at the spaced positions. A set of at least two power applicators is mounted with the conduit at different locations along the conduit. The power applicators apply electrical power to the conduit to heat the conduit and the fluid in the conduit at an established temperature differential between the different locations. A control mechanism measures the level of power furnished to the power applicators to maintain the established temperature differential, and thus provide an indication of the flow rate based on the energy measured by the control mechanism.

The present invention is also adapted to control the flow of fluid at a measured rate of flow. A flow regulating valve responsive to the measure of the fluid flow is provided to control the flow of fluid to a desired flow rate based on the measured fluid flow rate.

The present invention does not require that any sensing devices be placed in the path of fluid flow in the conduit, and thus also affords a straight-through flow design for the conduit. The present invention requires only a small temperature differential for flow rate measurement and does not degrade temperature sensitive fluids.

The present invention also makes flow rate measurements while causing a relatively low pressure drop. The conduit in which flow is measured according to the present invention is formed of an electrically conductive material such as stainless steel, and the interior of the conduit may be coated with a suitable corrosion-resistant synthetic resin film.

DETAILED DESCRIPTION OF THE PREFERRED EMBODIMENTS

Figure 1:
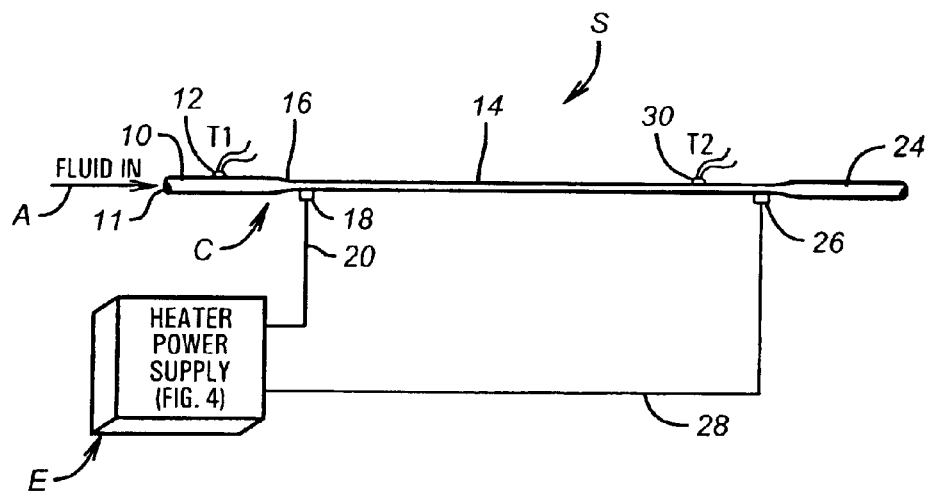
FIG. 1 is a side elevation view, taken partly in cross-section, of a flow rate sensor according to the present invention.
Figure 2:
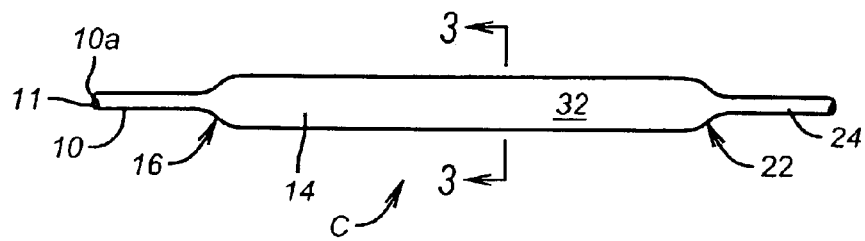
FIG. 2 is a plan view of a conduit in the flow rate sensor of FIG. 1.

In the drawings, the letter S designates generally a system according to the present invention for measuring the flow of fluid in a direction indicated by an arrow A through a conduit C. The fluid may be a gas or a liquid, and the present invention is particularly adapted for measuring low flow rates of fluid in the conduit C. As will be set forth, the system S of the present invention may sense flow rates of milliliters per minute of fluids, such as gasses or liquids.

The conduit C includes an inlet section 10 for incoming flow of fluid being measured according to the present invention. The conduit C is made of conventional stainless steel having low resistance to electrical current, such as 304 or 316 stainless steel. Such a material has a low thermal coefficient of resistance, which minimizes change in the resistance of the conduit C with change in temperature. The inlet section 10 is cylindrical in cross-section for the flow of fluid within an interior passageway 11 surrounded by a cylindrical tubular wall 10a. In one embodiment of the present invention, the inlet section 10 has an outside diameter of 0.050" and an inner dimension of 0.02". If the fluid which is being measured for flow rate according to the present invention is a corrosive fluid, the interior wall 10a of the conduit C may be coated with a suitable corrosion-resistant material, such as a fluorinated hydrocarbon or other corrosion-resistant synthetic resin film coating.

Figure 3:
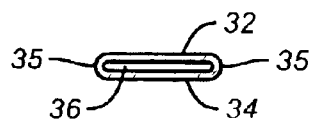
FIG. 3 is a cross-sectional view taken along the lines 3—3 of FIG. 2.

A first heat detector or thermocouple 12 or other suitable heat sensing device capable of forming an electrical indication of sensed temperature is attached by suitable techniques to the inlet section 10. The thermocouple 12 senses ambient or reference temperature of the tube inlet section 10 and the incoming fluid to be measured in the system S. A heat transfer section 14 is formed in the conduit C in the downstream direction of fluid flow from a transition area 16 of the inlet section 10. In the transition area 16, the conduit C changes from a cylindrical or tubular cross-section to one better adapted for heat transfers as will be set forth. A power applicator electrical contact 18 is formed on the heat transfer section 14 of the conduit C for connection through an electrical connector 20 to an electronic control circuit E (FIGS. 1 and 3) of the system S. With the present invention, the reference temperature sensing thermocouple 12 is located outside of, and upstream, of the heat transfer section 14.

The heat transfer section 14 of the conduit C extends from the transition area 16 to a second transition area 22 communicating with a cylindrical outlet portion 24. The conduit C reverts to a cylindrical cross-section in the second transition area 22. A power applicator electrical contact 26 is formed on the conduit C adjacent the transition area 22 and the outlet portion 24, and is connected to the electronic circuit E by a conductor 28. A second heat detector or thermocouple 30 or other suitable heat sensing device of a same or comparable type to the thermocouple 12 is mounted on the conduit C. The second heat detector 30 is located a suitable spaced distance along the heat transfer section 14 from thermocouple 12 to sense the temperature of the conduit C and its fluid contents at a location allowing for a measurable temperature differential to exist. The second temperature sensor thermocouple 30 detects any rise in temperature of the heat transfer section 14. Thus, for a fixed or given rise in temperature, the differential response is not sensitive to changes in ambient temperature of fluid entering the system S. This, in conjunction with the stainless steel material of the conduit C discussed above, makes the output of the sensor less sensitive to changes in ambient temperature of the fluid. This is in contrast to flow sensors that rely on a change of resistance of the sensing element as the heat transfer rate changes with the rate of flow of the fluid.

As will be set forth, electrical current flows through the heat transfer section 14 in the walls of the conduit C between the electrical contacts 18 and 26 to maintain a specified temperature differential between the spaced location of the thermocouples 12 and 30 on the conduit C.

The heat transfer section 14 may be flattened, using a press or other suitable mechanism, over the extent of the heat transfer area from the transition section 16 to the transition section 22 for more efficient heat transfer from the conduit C to the fluid contained in it. For example, heat transfer section 14 is flattened over a length of about 1 inch from the cylindrical or tubular shape of the inlet and outlet sections 10 and 24. The resulting heat transfer section is a flattened ellipse in cross-section, one inch in lateral extent, as is shown by generally flat upper walls 32 and 34. The upper and lower walls 32 and 34 are connected at their end sections by arcuate side walls 35 (FIG. 3) about a flattened inner passageway 36 which is 0.046" wide and 0.020" high. If desired, the heat transfer section need not be flattened fully to the flattened ellipse, but may be a more oval ellipse, depending on the required amount of heat transfer.

The configuration of the heat transfer section 14 improves thermal contact between the heat-bearing mass of the walls of the conduit C and the fluid passageway 36 and provides for thermal uniformity of the fluid in the conduit C as it travels through the heat transfer section 14. As noted, the flattened cross-section configuration of the heat transfer section 14 may be any suitable degree of elliptical or oval shape to achieve the desired heat transfer without introducing significant pressure drops over the range of fluid flow rates up to the maximum flow rate expected in the fluid being measured.

Alternatively, the conduit C may be located within an outer housing so that the flow of fluid is over the outer surface of the conduit C. The outer surface is preferably coated with a suitable corrosion resistant material, of the type discussed above. In such a case, the conduit or tube C has an outside diameter of 0.050" and has the instrumentation connections located within inner portions. The conduit C heats the fluid and the outer surface of the conduit C is in contact with the flow of the fluid for heat transfer in the manner described above. This configuration allows use of a conduit which lends itself more readily to application of a corrosion-resistant coating. Also, sealing between the conduit C and the outer housing is easier to achieve and maintain.

Figure 4:
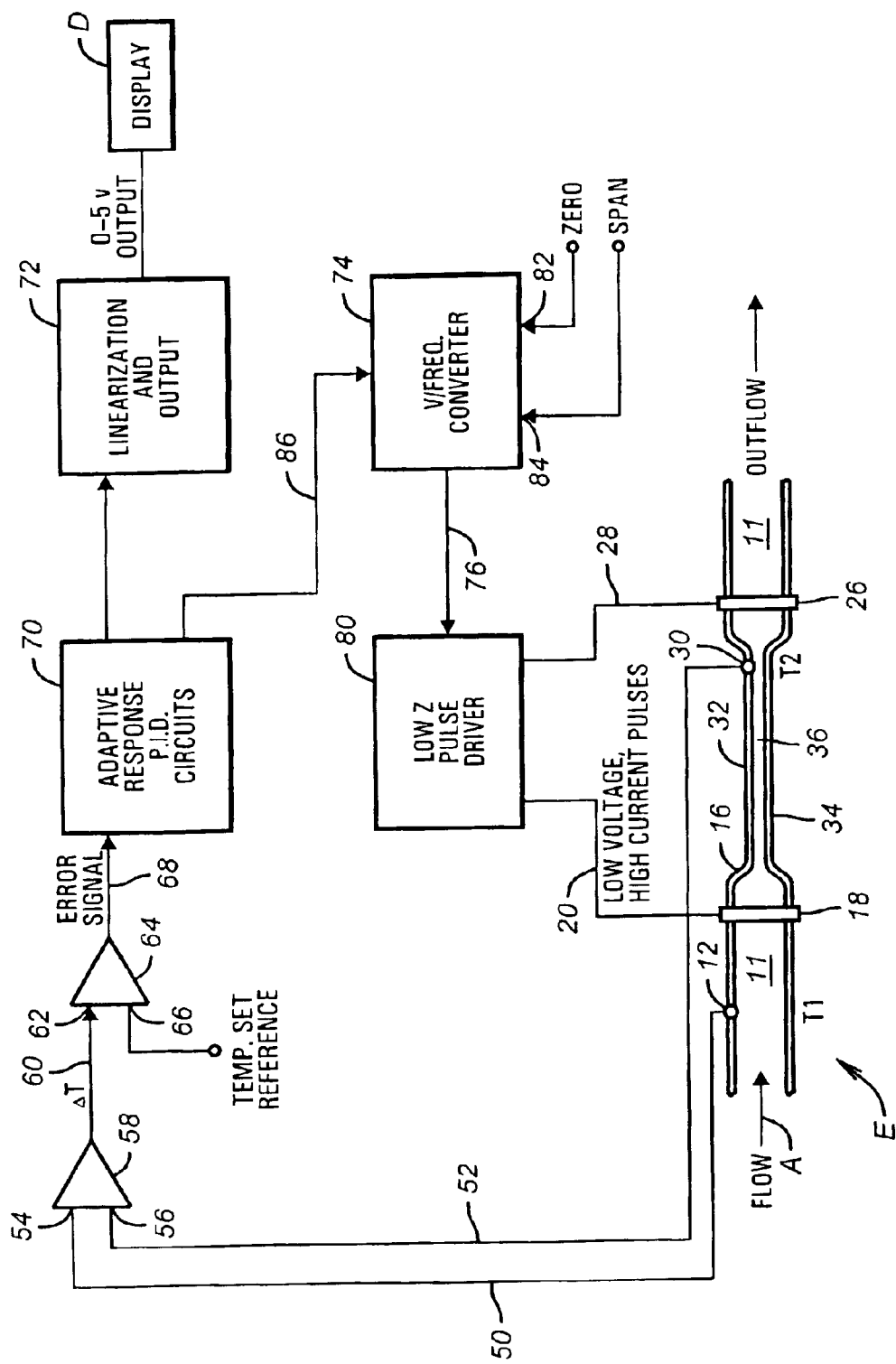
FIG. 4 is a functional block diagram of electronic components of an electrical circuit of the flow rate sensor of FIG. 1.

The electronic circuit E of the present invention provides electrical power which is furnished to power applicator electrical contacts 18 and 26 to heat the fluid in the conduit C and maintain an established temperature differential between the locations of the heat detector thermocouples 12 and 30. The thermocouples 12 and 30 may be, for example, conventional type J or type K thermocouples or other suitable types of comparable operation and characteristics. The electronic control circuit C also measures the level of power furnished to the electrical contacts 18 and 26 to maintain the established temperature differential so that a measure of the fluid flow rate may be provided by an indicator D. In the electronic circuit E (FIG. 4) of the system S, the thermocouples 12 and 30 are connected by electrical connectors 50 and 52 to inputs 54 and 56, respectively, of a stabilized differential amplifier 58. The differential amplifier 58 is a conventional one, a commercially available stabilized amplifier of the type providing for temperature stability of measurements furnished to subsequent amplifier stages. Differential amplifier 58 forms an output signal on a lead 60 representing the temperature difference $\Delta T$ between that sensed by the temperature sensing thermocouples 12 and 30 on the conduit C.

The temperature differential signal on the lead 60 is furnished to a first input 62 of a comparator amplifier 64. The comparator amplifier 64 is an operational amplifier of the conventional type which receives at a second input 66 a signal level representing a reference temperature differential setting. The comparator amplifier 64 forms an output error signal on a lead 68 representing the variation of the temperature differential sensed between the temperature sensors 12 and 30 on the conduit C and the reference temperature differential provided to the second input 66.

Figure 6:
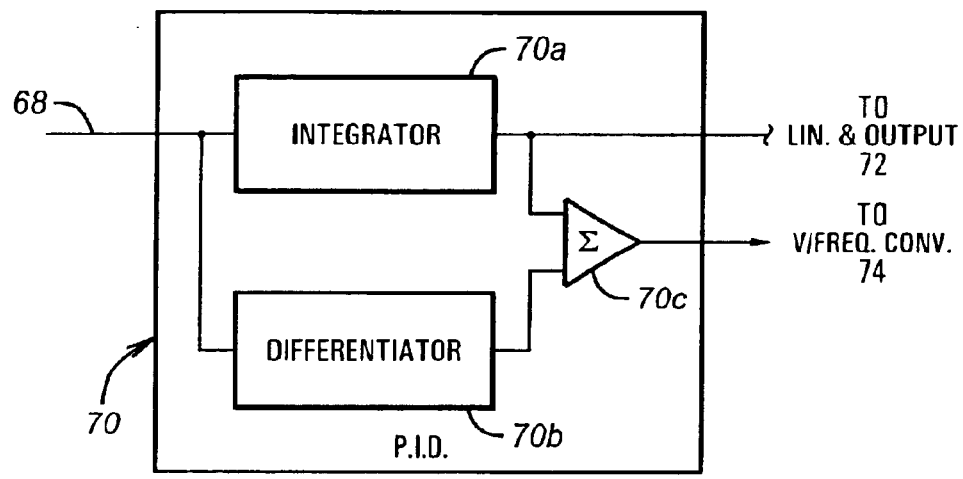
FIG. 6 is a schematic diagram of an adaptive response unit of the circuit of FIG. 4.

The output error signal from the comparator amplifier 64 is furnished on a lead 68 to an adaptive response proportional integral derivative, or PID, unit 70 (FIG. 6). The PID unit 70 includes an integrator 70a which forms a response signal indicating a time-averaged measure of the temperature error signal detected by comparator amplifier 64. The PID unit 70 also includes a differentiator 70b which forms an output indicative of the rate of change of the error signal from comparator amplifier 64. The PID unit 70 also includes a summing amplifier or component 70c forming an output signal.

The adaptive response circuit 70 does not use fixed filtering or integration time. The tracking response of the circuit 70 is varied to provide fast response at high flow and slow response at zero or near zero flow, which is necessary due to the extreme range of the thermal response of the flow tube as the flow changes between the maximum and minimum flow rates. Additionally, the tracking response is reduced as the rate of flow approaches zero to provide an output with minimum fluctuations.

The output signal from integrator 70a of PID unit 70 is furnished to a linearization and output circuit 72 where the response signal is linearized and put in a suitable format, such as a suitable level of voltage of direct current 0–5V. Linearization and output circuit 72 may, for example, be a conventional operational amplifier providing a suitable level output signal for storage, processing and display purposes in a suitable indicator or display D, which may have a suitable record-keeping mechanism or memory associated therewith. The display D may be, for example, a Model 250 display available from McMillan Company, Assignee of the present application. If desired, the response signal may be converted into digital formal for digital processing, computation and storage in a suitable display D. The display output from the output circuit 72 represents the present value of the flow rate sensed of fluid in the conduit C by the system S according to the present invention.

The output response from summing amplifier 70c of PID unit 70 is furnished to a voltage-to-frequency converter 74. The voltage-to-frequency converter takes the form, for example, of the voltage-to-frequency portion of a commercially available phase-locked loop. It can be any suitable, commercially available voltage-to-frequency, or V/F, converter. The level of the output response from amplifier 70c of the PID unit 70 causes an appropriately correlated variation in the output frequency of a signal on conductor 76 from the converter 74. The output frequency from the converter 74 is furnished to a pulse driver circuit 80. The voltage-to-frequency converter 74 is provided with a signal at a zero input 82 and a span input 84, respectively, for calibration purposes.

Figure 7:
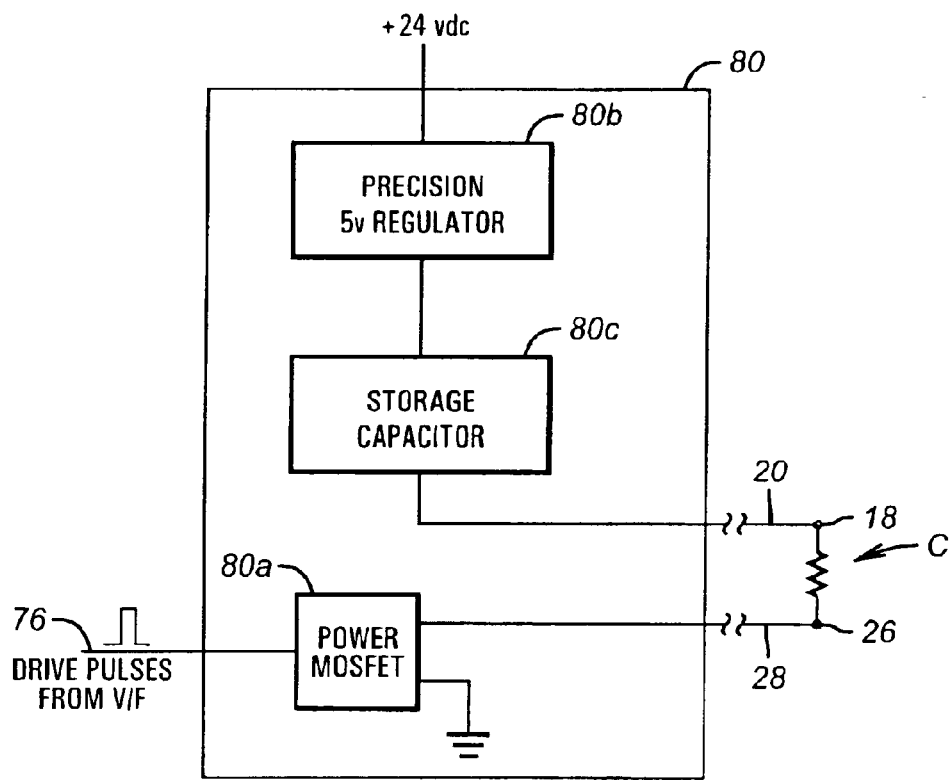
FIG. 7 is a schematic diagram of a pulse driver unit of the circuit of FIG. 4.

The pulse driver circuit 80 (FIG. 7) receives at a power MOSFET switch 80a drive pulses over connector 76 from voltage-to-frequency converter 74. The power MOSFET switch 80a is connected through conductors 20 and 28 to electrical connectors 18 and 26, mounted with the tube or conduit C. The pulse driver circuit 80 includes a power regulator 80b connected to a suitable power source and a storage capacitor 80c storing electrical energy for flow as current pulses through the tube C. The pulse driver circuit 80 is a low impedance pulse driver, providing low voltage, high current pulses when switch 80a is conductive. Operation of switch 80a is at a frequency governed by the output frequency of the converter 74. The low voltage, high current pulses from the pulse driver circuit 80 flow through the walls 32 and 34 of the flattened heat-transfer section 14 of the conduit C between the connectors 18 and 26.

The pulse driver circuit 80 delivers precision, high peak energy pulses to the stainless steel flow-tube C to rapidly and precisely heat the tube and the fluid. Operation of pulse driver circuit 80 results in low average power being consumed; low energy losses; and the heat energy applied being proportional to the flow of the fluid.

When flowing liquids, considerable energy is required to raise the temperature of the flowing liquid, as compared to air. The heating conduit C, having a low electrical resistance, requires an efficient drive circuit capable of precision heating with a minimum loss of energy dissipated in other parts of the circuitry. The pulse driver circuit 80 is capable of controlling the large differences in power required when flowing high and low rates of liquids and gasses.

Figure 5:
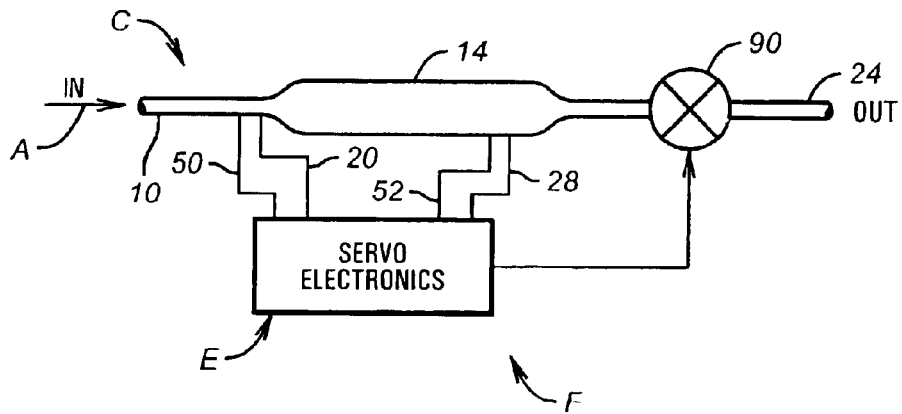
FIG. 5 is a functional block diagram of a flow control system according to the present invention.

The present invention may also be used to provide a flow control system F (FIG. 5). In the flow control system F like structure to that of the system S functioning in a like maimer bears like reference numerals. In the flow control system F, the output signal from the linearization and output circuit 72 of the electronic circuit E is furnished to an electrically operated flow control valve 90 located in the conduit C downstream from the heat transfer section 14. Thus, as the flow rate of the fluid in the conduit C varies, the electronic circuit E provides indications to the flow control valve 90 to regulate the rate of flow of the fluid through the conduit C to a desired level. Flow control valve 90 may be of a conventional type or of a type available from the Assignee of the present application, McMillan Company.

Figure 8A:
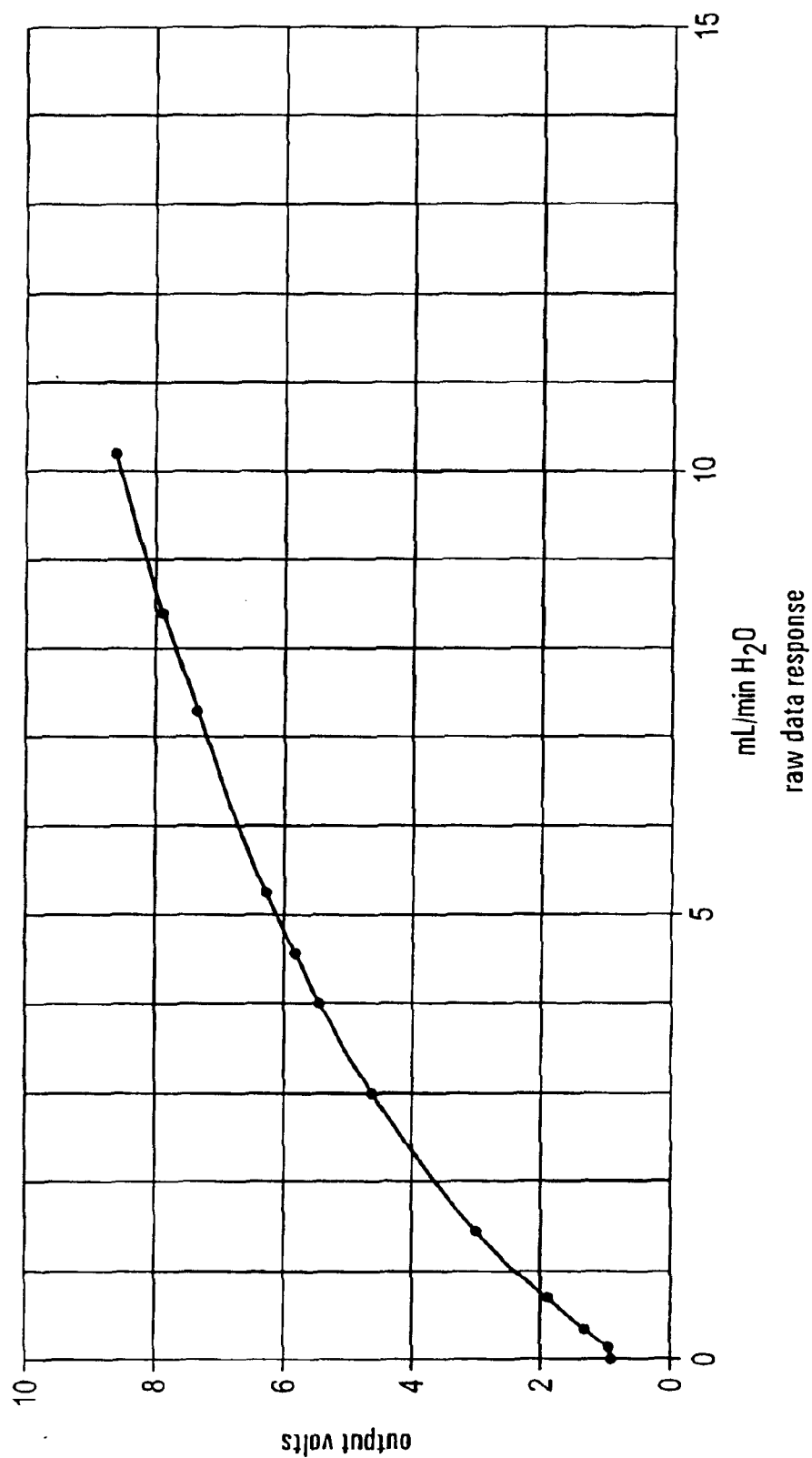
FIGS. 8A, 8B, 8C, 9A, 9B, 9C, 10A and 10B are graphs illustrating performance of a flow rate sensor according to the present invention.
Figure 8B:
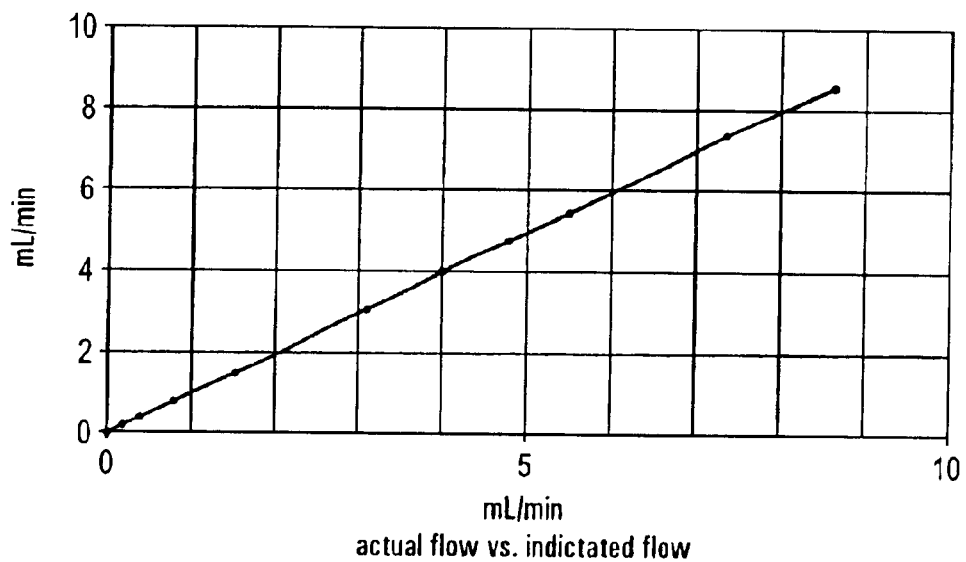
Figure 8C:
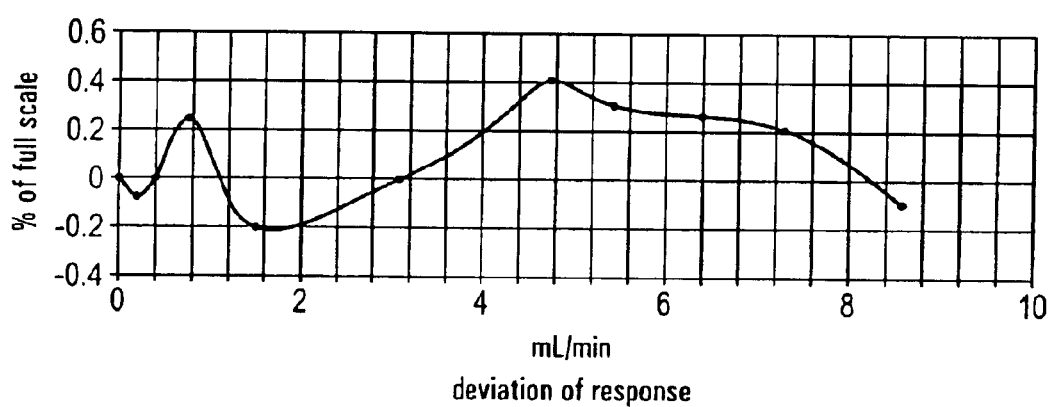
Figure 9A:
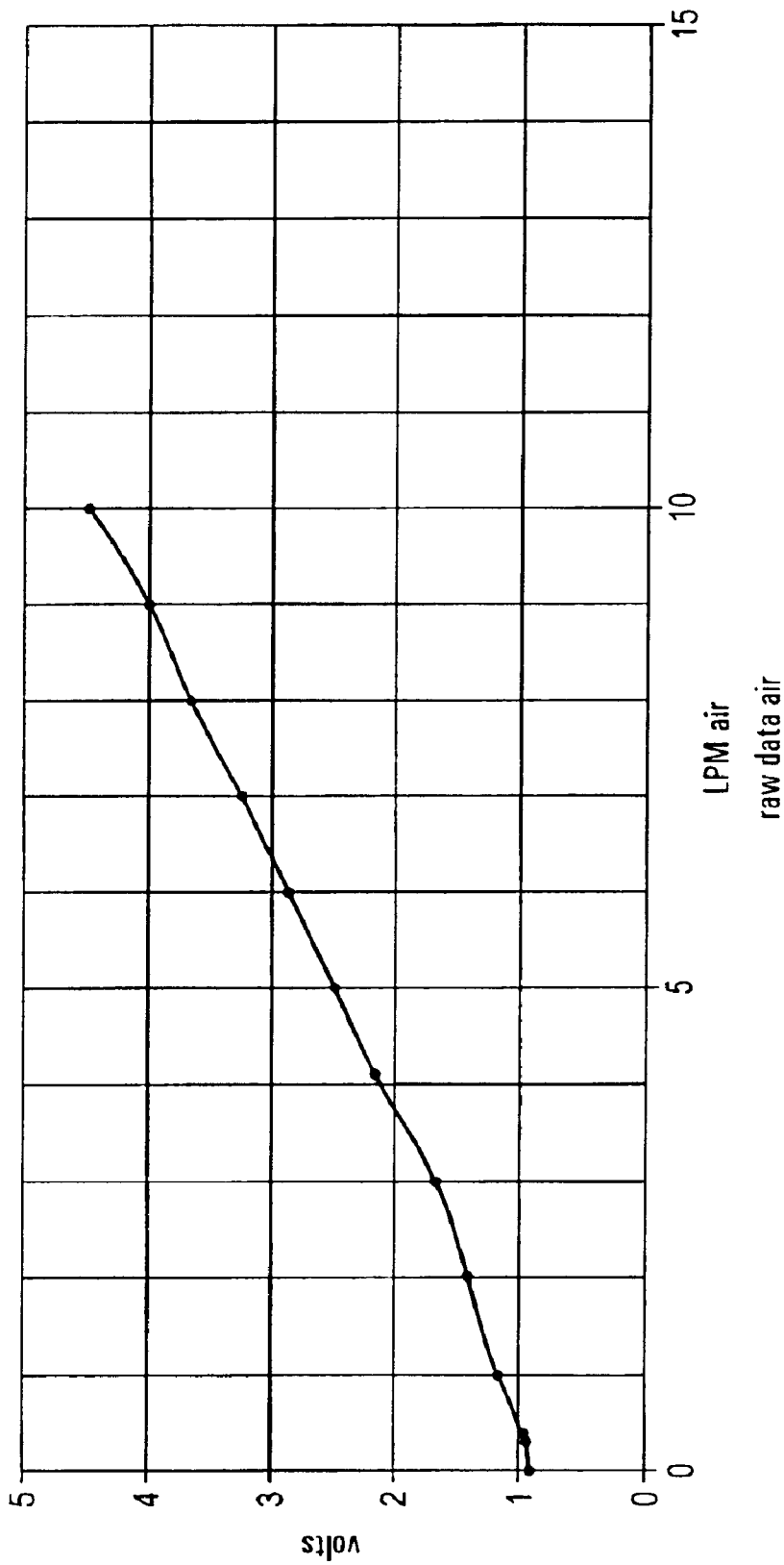
Figure 9B:
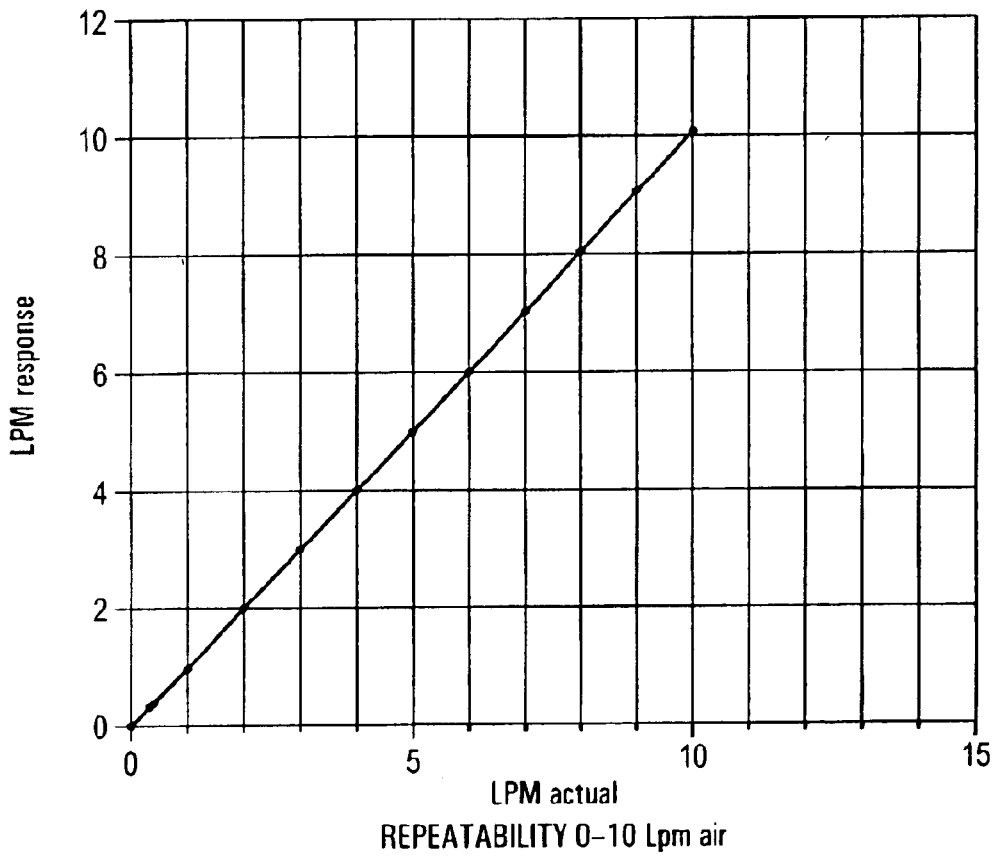
Figure 9C:
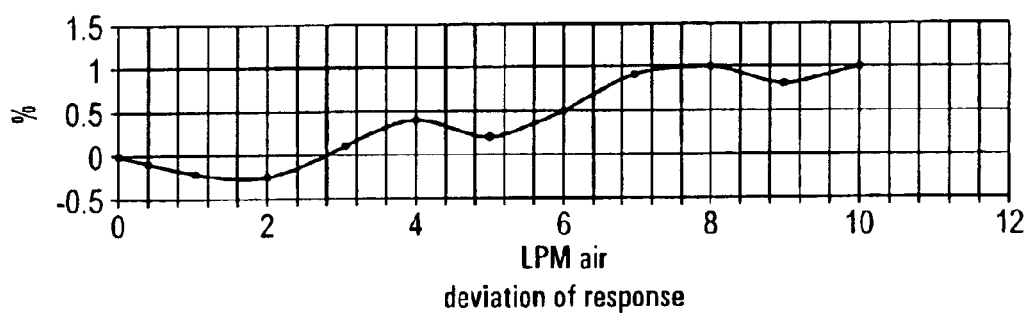

FIGS. 8A and 9A are basic response curves of a flow rate sensor according to the present invention to the flow of water and air, respectively, at the flow rates indicated. The data shown was obtained during preliminary testing and was obtained from the values and dimensions of the indicated flow tube C. Refinements and dimensional changes are expected to improve operating parameters for different flow rates and fluids. These figures illustrate a sensitive response to flow changes at low volume flow rates of these fluids. FIGS. 8B and 9B represent the responses of FIGS. 8A and 9A, respectively, after linearization. The linearized responses indicate the accuracy obtained with the flow sensor of the present invention at known input flow rates. In addition, FIGS. 8C and 9C indicate the accuracy obtained in the data of FIGS. 8B and 9B, respectively, as a percentage of full scale readings.

Figure 10A:
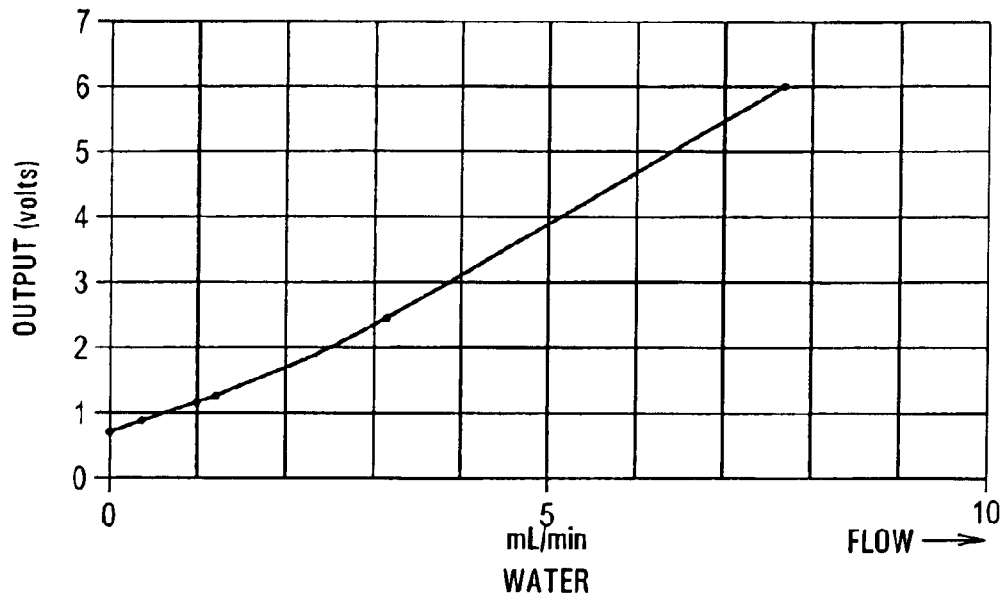
Figure 10B:
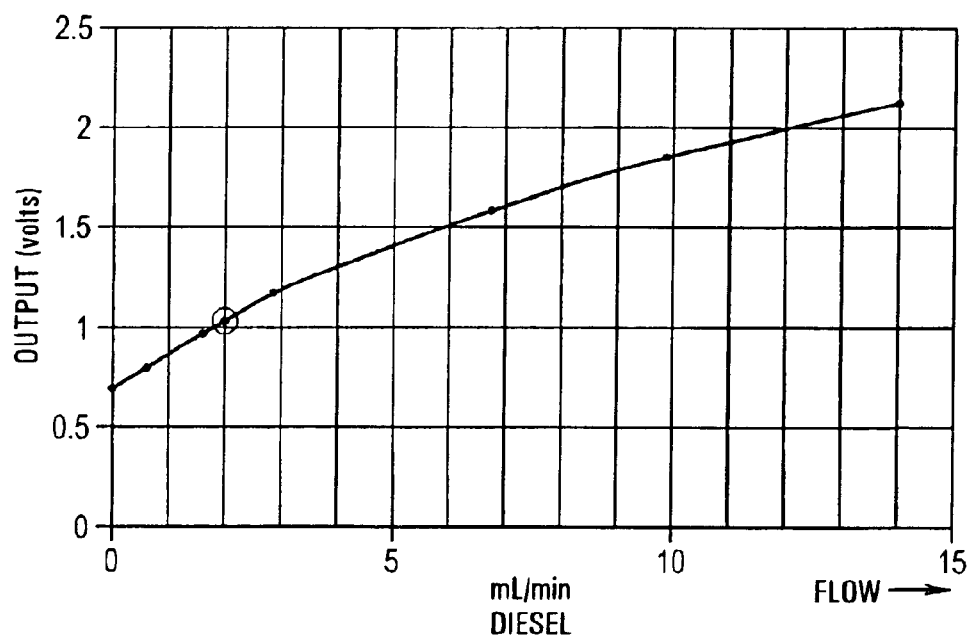

FIGS. 10A and 10B are plots of test data similar to that of FIGS. 8A and 9A, with water and diesel fuel being the liquid flowing at the milliliters/minute rates indicated. Comparable accuracy and sensitivity are indicated in FIGS. 10A and 10B to the results discussed above and shown in FIGS. 8A and 9A.

The present invention can be seen to provide a sensitive, accurate thermal flow sensor for fluids and gasses. The flow sensor of the present invention is a simple mechanical device which indicates a wide dynamic flow range. The flow sensors of the present invention possess high efficiency and precision heating controls, and can be constructed of readily available components at low cost.

The foregoing disclosure and description of the invention are illustrative and explanatory thereof, and various changes in the size, shape and materials, and components, as well as in the details of the illustrated construction may be made without departing from the spirit of the invention.

What is claimed is:

1. A system for measuring the flow of fluid, comprising:
    a conduit having walls for containing and transporting the fluid;
    at least two heat detectors mounted at spaced positions from each other on the conduit walls and measuring the temperature of the fluid and conduit at the spaced positions;
    at least two electrical power applicators mounted at different locations with the conduit and allowing electrical current to flow in the conduit walls to heat the fluid in the conduit and maintain an established temperature differential between the spaced positions;
    a control mechanism for obtaining measurements of the level of power furnished to the electrical power applicators to maintain the established temperature differential between the spaced positions; and an indicator mechanism responsive to the control mechanism providing a measure of the fluid flow rate based on the measurements obtained by the control mechanism.

2. The system of claim 1, further including:

a driver circuit applying pulses of electrical current to the electrical power applicators.

3. The system of claim 1, wherein the heat detectors comprises thermocouples.

4. The system of claim 3, further including:

an amplifier forming a measure of difference in temperature sensed by the heat detector thermocouples.

5. The system of claim 1, further including:

a comparator forming a signal representative of the variation of the temperature difference measured by the heat detectors from an established temperature differential.

6. The system of claim 1, wherein the control mechanism includes:

an adaptive response integrator forming an indication of the variation of the temperature difference.

7. The system of claim 6, further including:

a driver circuit applying pulses of electrical current to the electrical power applicators.

8. The system of claim 7, further including:

the adaptive response integrator providing a control signal to the driver circuit based on the variation of the temperature difference.

9. The system of claim 1, wherein the conduit is formed of an electrically conductive material.

10. The system of claim 1, wherein the conduit is formed of stainless steel.

11. The system of claim 1, wherein the conduit has an inner wall lined with a corrosion-resistant synthetic resin coating.

12. A system for controlling the flow of fluid at a measured rate of flow, comprising:

a conduit having walls for containing and transporting the fluid;

at least two heat detectors mounted at spaced positions from each other on the conduit walls and measuring the temperature of the fluid and conduit at the spaced positions;

at least two electrical power applicators mounted with the conduit and allowing electrical current to flow in the conduit walls to heat the fluid in the conduit and maintain an established temperature differential;

a control mechanism for obtaining measurements of the amount of energy furnished to the heat applicators to maintain the established temperature differential between the spaced positions;

an indicator mechanism responsive to the control mechanism providing a measure of the fluid flow rate based on the measurements obtained by the control mechanism; and a flow regulating valve responsive to the measure of the fluid flow rate to control the flow of fluid in the conduit.

13. A method of measuring the flow rate of a fluid in a conduit, comprising the steps of:

applying electrical power to the conduit at spaced locations along the length of the conduit to allow electric current to flow in the conduit to heat the fluid as the fluid flows in the conduit;

maintaining a specified temperature differential between spaced positions on the conduit while the electrical power is applied to the conduit as the fluid flows in the conduit;

measuring the electrical power supplied to maintain the specified temperature differential as the fluid flows in the conduit; and forming an indication of the flow rate based on the measured power to maintain the specified temperature differential as the fluid flows through the conduit.

14. A system for measuring the flow of fluid in a conduit, comprising:

at least two heat detectors mounted at spaced positions from each other on the conduit measuring the temperature of the fluid and conduit at the spaced positions;

at least two electrical power applicators mounted at different locations with the conduit and allowing electrical current to flow in the conduit walls to heat the fluid in the conduit and maintain an established temperature differential between the spaced positions;

a control mechanism for obtaining measurements of the level of electrical power furnished to the power applicators to maintain the established temperature differential between the spaced positions; and an indicator mechanism responsive to the control mechanism providing a measure of the fluid flow rate based on the measurements obtained by the control mechanism.

* * * * *